US006658353B2

(12) United States Patent
Shimizu et al.

(10) Patent No.: US 6,658,353 B2
(45) Date of Patent: Dec. 2, 2003

(54) VEHICLE NAVIGATION APPARATUS PROVIDING RAPID CORRECTION FOR EXCESSIVE ERROR IN DEAD RECKONING ESTIMATES OF VEHICLE TRAVEL DIRECTION BY DIRECT APPLICATION OF POSITION AND DIRECTION INFORMATION DERIVED FROM GPS POSITION MEASUREMENT DATA

(75) Inventors: Yasuhiro Shimizu, Tokoname (JP); Kiyoshi Tsurumi, Okazaki (JP)

(73) Assignee: Denso Corporation, Kariya (JP)

( * ) Notice: Subject to any disclaimer, the term of this patent is extended or adjusted under 35 U.S.C. 154(b) by 10 days.

(21) Appl. No.: 09/985,765

(22) Filed: Nov. 6, 2001

(65) Prior Publication Data

US 2002/0055819 A1 May 9, 2002

(30) Foreign Application Priority Data

Nov. 8, 2000 (JP) ........................................ 2000-340426

(51) Int. Cl.$^7$ ................................................. G01S 5/02
(52) U.S. Cl. ..................... 701/214; 701/200; 701/210; 701/215; 340/988; 73/178 R; 342/358
(58) Field of Search .................... 701/214, 200, 701/205, 207, 210, 213, 215; 340/988; 73/178 R; 342/358, 457

(56) References Cited

U.S. PATENT DOCUMENTS 4,792,907 A    12/1988   Ikeda et al. ................. 701/208

| 5,323,322 A | * | 6/1994 | Mueller et al. | ............. 701/215 |
| 5,680,140 A | * | 10/1997 | Loomis | ................. 342/357.03 |
| 6,014,101 A | * | 1/2000 | Loomis | ................. 342/357.02 |

FOREIGN PATENT DOCUMENTS

| JP | A-7-280575 | 10/1995 |
| JP | A-8-54248 | 2/1996 |
| JP | A-9-152342 | 6/1997 |
| JP | A-11-230772 | 8/1999 |
| JP | A-11-325928 | 11/1999 |

* cited by examiner

Primary Examiner—Thomas G. Black
Assistant Examiner—Arthur D. Donnelly (57) ABSTRACT

In a vehicle navigation apparatus having a control section which calculates relative vehicle positions and travel direction by dead reckoning calculations based on outputs from on-board sensors and periodically acquires GPS measurement data via a GPS receiver and applies error-reduction filter processing to these data to obtain position and travel direction information for correcting the calculated relative positions, the apparatus has a function for detecting that a travel direction obtained by dead reckoning contains an excessive error, and when that condition is detected, for directly applying an estimated vehicle position and travel direction derived directly from the GPS data, without filter processing, to correct the corresponding relative position and travel direction estimates. Rapid correction can thereby be achieved when the vehicle has been operated in a condition whereby a large amount of error has suddenly arisen in the travel direction that is estimated by the apparatus through dead reckoning calculation, e.g., after the vehicle has been rotated on a turntable with the vehicle navigation apparatus inoperative.

8 Claims, 5 Drawing Sheets

VEHICLE NAVIGATION APPARATUS PROVIDING RAPID CORRECTION FOR EXCESSIVE ERROR IN DEAD RECKONING ESTIMATES OF VEHICLE TRAVEL DIRECTION BY DIRECT APPLICATION OF POSITION AND DIRECTION INFORMATION DERIVED FROM GPS POSITION MEASUREMENT DATA

BACKGROUND OF THE INVENTION

1. Field of Application

The invention relates to a vehicle navigation apparatus which estimates the current position of a vehicle by utilizing GPS (Global Positioning Satellite) position measurement data, for correction of relative position and travel direction information obtained by dead reckoning navigation calculations based on signals produced from sensors which are mounted on the vehicle.

2. Description of Prior Art

Types of vehicle navigation apparatus are now widely utilized, whereby the current position and travel path of the vehicle are indicated on a display device, superimposed upon a displayed road map of the region in which the vehicle is currently travelling. The apparatus may also be capable of determining and displaying the optimum route between that current position and a destination which is specified by the vehicle driver. With such an apparatus it is of course essential to determine the current position as accurately as possible under various different driving conditions. Typically with such an apparatus, an output signal produced from a gyroscope, indicative of changes in the vehicle course direction (i.e., detected as amounts of turning of the vehicle about a predetermined axis of the gyroscope) is used, with each such change representing a change in the travel direction of the vehicle in relation to a previously determined absolute travel direction (where, for brevity of description, the term "travel direction" is used herein to refer to an estimated instantaneous direction of travel of a vehicle, derived together with an estimated current position of the vehicle). The direction change information from the gyroscope is used in conjunction with distance information expressing a distance that has been traveled by the vehicle relative to some preceding (absolute) estimated position of the vehicle, i.e., distance information obtained based on an output signal from a vehicle speed sensor, to perform dead reckoning calculations to obtain the estimated current position and travel direction of the vehicle. Such methods are described for example in Japanese patent HEI 8-54248, etc.

With such a method, on-board sensors of the vehicle itself are used to detect the vehicle position and travel direction, so that there is the disadvantage that it is not possible to obtain absolute position values.

Furthermore, when a gyroscope is utilized to measure changes in vehicle travel direction, the measurement is based on detecting values of angular velocity of rotation about the aforementioned predetermined axis of the gyroscope. When that axis does not correspond to the axis about which the vehicle actually rotates when performing a turn, then the conversion gain of the gyroscope (which is a proportionality constant, predetermined beforehand as a conversion factor for conversion to angular velocity) will differ from the correct conversion factor. Thus a conversion gain error (referred to in the following simply as the gain error) will arise. Moreover when a gyroscope is utilized, the value of output voltage of the signal produced from the gyroscope when the detected angular velocity is 0 (deg/s) is used as a reference voltage value, with that value being referred to in the following as the offset. However this offset may vary, due to various factors, so that when actual angular velocity is 0 (deg/s), the difference between the output voltage from the gyroscope and the offset may not be zero. As a result, a drift error will arise the in angular velocity detection results. Due to the above reasons, errors may arise in determining an amount of change in the vehicle travel direction, and the accuracy of detecting the current position of the vehicle will thereby be reduced. The effects of such drift and offset errors will be cumulative.

Because of the sources of inaccuracy described above, methods of vehicle position detection are utilized whereby position measurement data conveyed by radio waves transmitted from a source such as the GPS system are used to periodically obtain absolute position and travel direction information, for use in correcting the positions and directions that are derived by dead reckoning based on the on-board sensor outputs as described above. Specifically, while the vehicle is being driven in a condition in which such radio waves conveying the GPS position measurement data can be received, successive absolute positions and corresponding travel directions of the vehicle are derived based on these data at periodic intervals, with each set of information thus obtained being used to correct the positions and travel directions which are derived by dead reckoning using the vehicle on-board sensors.

However with the GPS system (as available for public use), the absolute position and direction estimates which are obtained thereby contain substantial amounts of randomly varying error, which may have a magnitude of up to approximately 100 meters in the case of position estimates. The successive relative position and travel direction estimates which are obtained from the dead reckoning calculations on the other hand will contain relatively small amounts of such randomly varying error, under a normal condition of operation of the vehicle, but may contain significant amounts of drift and offset error, for the reasons mentioned above.

For that reason, position and travel direction information derived based on the GPS data are generally subjected to a form of filter processing for reducing the effects of the random errors in these data, with the result being applied to correct the estimated positions and travel directions derived by dead reckoning. The most widely utilized form of such processing is the Kalman filter.

Successive sets of corrected vehicle position and travel direction estimates which are thereby derived are combined to obtain an estimate of the path which has been traveled by the vehicle up to the current position. Periodically, that estimated travel path is applied in map matching processing, i.e., the path is compared with data expressing a road map of a region in which the vehicle is currently travelling, to make use of the fact that the vehicle location is in general constrained to streets or freeways, etc., and thereby further increase the accuracy of a finally estimated current position of the vehicle. In that way it becomes possible to accurately obtain and display the route which is being traversed by the vehicle and its current position.

Under normal driving conditions, such a type of vehicle navigation apparatus can provide accurate results. However substantial amounts of error may arise in the estimated vehicle travel direction that is derived by such an apparatus, under some special circumstances. A first case of such special circumstances is when the vehicle is driven into a location such as a multistory car park, then performs a number of successive turns during a short time interval, e.g., while driving up and around a series of ramps within the car park. This can result in substantial error for the following reasons:

(a) The gain error of the gyroscope will cumulatively increase as the successive turns are executed, even if the detection axis of the gyroscope is correctly oriented with the turning axis of the vehicle and the gyroscope is mounted correctly in relation to the direction of the action of gravity under normal driving conditions. Specifically, when driven up the ramps within a multistory car park, and thereby performing successive turns, the attitude of the vehicle will be altered due to vehicle roll to the left or right side as the successive turns are executed, and due to the lateral axis of the vehicle becoming tilted (i.e., occurrence of pitch) by the slope of the ramps. Such changes in the vehicle attitude may cause changes in the orientation of the detection axis of the gyroscope in relation to the direction of action of gravity. As a result, the conversion factor of the gyroscope will change, so that the conversion gain will contain a gain error. Furthermore, errors due to variations in offset will cumulatively increase, when the vehicle executes such repetitive turns, so that this error will also become large. As a result, after completing such a succession of turns within a multistory car park, the estimated vehicle direction that is then obtained by dead reckoning calculation using the gyroscope may contain a large amount of error.

(b) In general, it will be difficult or impossible to receive GPS radio waves when the vehicle is located within such a multistory car park, so that it will not normally be possible for the vehicle navigation apparatus to effect correction of the estimated travel direction based on GPS-derived data.

(c) Even if acquisition of GPS position measurement data is possible under such a condition (e.g., immediately following completion of such a succession of turns) it will in general not be possible to apply appropriate map matching processing to the results, (since the vehicle is not located on a street or highway), so that the GPS position measurement data cannot be used in accurately correcting the error which arises in the estimated travel direction.

A second of such special conditions is when the vehicle is driven onto a turntable and is then turned through some arbitrary angle, with the vehicle engine ignition switched off so that the vehicle navigation apparatus is inoperative. When the ignition is subsequently switched on and the vehicle thereafter starts to be driven, there may be a large amount of deviation between the direction of travel that is indicated by the vehicle navigation apparatus at that time (which is the direction of travel most recently estimated prior to switching off the ignition and thereby cutting off the operating power for the apparatus) and the actual direction of travel.

When such a special condition has occurred and the vehicle then begins to be driven (e.g., out of a parking lot), a certain amount of time must elapse before sufficient correction of the direction error can be achieved. The reason for this is that, as described above, each vehicle position and travel direction which is derived from received GPS positioning data is not applied directly, but instead is utilized in processing such as Kalman filtering, with the results being then applied to correct the dead reckoning estimates of position and travel direction.

So long as the travel direction estimates which are derived from the dead reckoning calculations successively vary in a normal manner, no problems will arise. However when a sudden abnormal change occurs in that series of travel direction estimates, for a reason such as described above, then even if acquisition of the GPS positioning data can be achieved immediately after the vehicle begins to be driven thereafter, a significant amount of time will elapse before the position and travel direction estimates that are derived from the filter processing will be of sufficient accuracy to enable successful map matching processing to be performed. That is to say, a number of GPS positioning data acquisition operations must be successively performed, before effective correction of the positions and travel direction derived by the vehicle navigation apparatus for use in map matching processing become sufficiently accurate for that purpose.

As a result, when the vehicle starts to be driven after such a special condition has occurred, a certain amount of delay may occur before the vehicle navigation apparatus begins to generate an accurate display of the vehicle current position and travel path, i.e., a delay during which there may be a large amount of error in the information displayed by the vehicle navigation apparatus.

SUMMARY OF THE INVENTION

It is an objective of the present invention to overcome the disadvantages of prior types of vehicle navigation apparatus as set out above, by providing a vehicle navigation apparatus whereby even when a vehicle has been operated under special circumstances whereby a large amount of error in the estimated travel direction of the vehicle has arisen, correction of the error can be rapidly performed.

To achieve this objective with a vehicle navigation apparatus according to the present invention, when such a special condition has occurred and the vehicle thereafter begins to be driven, then after GPS position measurement start to be acquired, each of respective estimated vehicle positions which are derived directly based on the GPS data, without application of filter processing, is compared with a corresponding (i.e., substantially concurrently derived) vehicle position that is obtained by dead reckoning calculations based on the vehicle sensor outputs. If there is more than a predetermined degree of deviation between these two positions, then the vehicle position derived from the GPS positioning data is applied directly to correct the corresponding vehicle position obtained from the dead reckoning calculations, while the travel direction derived from the GPS data is similarly directly applied. This operation is repeated for successively acquired GPS-derived position estimates, until it is judged that the aforementioned deviation magnitude is no longer exceeded. Thereafter, normal operation is commenced, with filter processing such as Kalman filter processing being applied to the GPS-derived position and travel direction data and the results applied to correct the corresponding estimated positions and travel directions which are derived from the dead reckoning calculations.

It can be understood that with such a form of operation of a vehicle navigation apparatus, although it is known that a certain degree of error exists in the vehicle positions which are derived from the GPS position measurement data when utilized directly without filter processing, these data are used directly in order to achieve more rapid estimation of the actual travel path of the vehicle, after a special condition has occurred whereby there is a large amount of error in the vehicle travel direction as estimated by dead reckoning calculations.

In that way, when such a condition of substantial error in the estimated travel direction has arisen, accurate position and travel path information can quickly begin to be obtained and displayed by the vehicle navigation apparatus.

The vehicle navigation apparatus may be configured with means for judging that the distance between a vehicle position as estimated using the on-board sensors for dead reckoning calculation and the corresponding vehicle position as derived directly from GPS position measurement data exceeds a predetermined amount, and for directly applying the position and travel direction estimates obtained directly from the GPS measurement data to correct the corresponding dead reckoning position and travel direction estimates when it is found that the predetermined amount is exceeded.

Alternatively, the vehicle navigation apparatus includes means for registering the estimated position of the vehicle at the time when such a special condition may have arisen, as a reference position. This reference position may be the latest position that was estimated by the vehicle navigation apparatus prior to switching off the vehicle ignition, and thereby disconnecting the power supply to the vehicle navigation apparatus. Alternatively, or in addition to such means, the vehicle navigation apparatus can include means for detecting that the vehicle has been driven in succession around a number of complete Turns within a short time interval, and for establishing the estimated position of the vehicle upon completion of these turns as being the reference position. In that case, the vehicle navigation apparatus may further include means operating (each time that a GPS data acquisition operation is executed) for calculating a vector extending from the reference position to a vehicle position that is currently estimated by the vehicle navigation apparatus based on dead reckoning and a vector extending from the reference position to the corresponding vehicle position that is derived directly from the GPS position measurement data (with no filter processing applied), and for judging whether the angle between these vectors exceeds a predetermined value. If that value is exceeded, then the GPS position measurement data are used directly, without filtering, to correct the vehicle position and travel direction which are obtained by dead reckoning. If the angle between the vectors does not exceed the predetermined value, then the position and travel direction information obtained based on the GPS position measurement data are applied in the usual manner, through filter processing. Hence, the invention enables a vehicle navigation apparatus to be provided whereby, even when some special circumstance has arisen which has caused the travel direction derived by the apparatus through dead reckoning calculations to become substantially different from the actual travel direction, GPS position measurement data are utilized in a manner whereby the actual travel path and current position of the vehicle can be rapidly estimated by the vehicle navigation apparatus, to a sufficient degree of accuracy for use in map matching processing.

DESCRIPTION OF PREFERRED EMBODIMENTS

Figure 1:
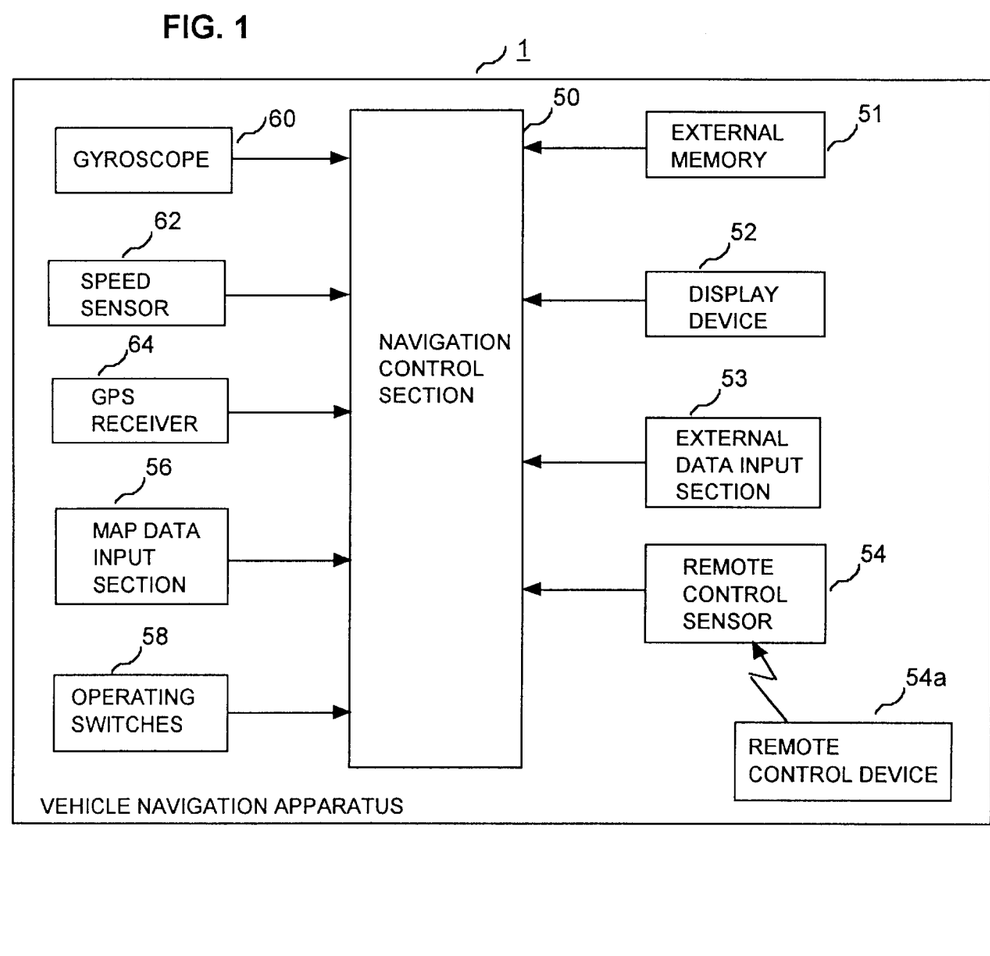
FIG. 1 is a general system block diagram of an embodiment of a vehicle navigation apparatus according to the present invention.

An embodiment of a vehicle navigation apparatus will be described in the following referring to the drawings. FIG. 1 is a system block diagram showing the overall configuration of this embodiment. As shown, the vehicle navigation apparatus 1 includes a gyroscope 60, which detects the angular velocity of turning motion of the vehicle in which the apparatus is mounted, a speed sensor 62 which generates speed pulses, i.e., signal pulses generated at a rate indicative of the running speed of the vehicle, a GPS receiver 64 which receives (via an antenna, not shown in the drawing) radio waves conveying position measurement data that are transmitted from the GPS system, for use in estimating the (absolute) current position and travel direction of the vehicle, a map data input section 56, a set of operating switches 58, an external memory 51, a display device 52, an external data input section 53 and a remote control sensor 54. Each of the above are connected to a navigation control section 50, which performs overall control of the apparatus. The apparatus further includes a remote control device 54a, whereby the vehicle driver can input commands or data to the vehicle navigation apparatus 1 via the remote control sensor 54.

The map data input section 56 has data including road map data stored therein, on a readable data storage medium such as for example a DVD-ROM or CD ROM, memory card, etc. The display device 52 is a color display device such as a CRT, LCD or plasma display type of device etc., for displaying a road map showing the current travel path and position of the vehicle superimposed thereon, and may also serve to generate an indication of an optimum route (guidance route) to be taken by the vehicle to a specific destination. The external data input section 53 serves to receive infrastructure information provided from an external source such as a VICS (Vehicle Information and Communication System) to the navigation control section 50, to be processed thereby, and for transmitting information from the navigation control section 50 to the exterior of the vehicle when necessary.

It will be assumed that the navigation control section 50 of this embodiment is implemented as a digital computer configured from a CPU (central processing unit), internal RAM and ROM, data and address buses, etc., operating under a control program which is stored on a data storage medium, with data and commands being supplied to/from the navigation control section 50 via I/O ports in the usual manner. One function of the navigation control section 50 is to determine the current direction and direction of travel of the vehicle, based upon data supplied from the GPS receiver 64 which are used to estimate the absolute position and travel direction of the vehicle and the signals supplied from the gyroscope 60 and speed sensor 62 which are used in estimating relative positions and travel directions of the vehicle by dead reckoning navigation calculation, which are periodically corrected by applying the estimated absolute positions and directions. Periodically, a plurality of sets of corrected estimated positions and corresponding travel directions, derived up to the current point in time, are used to estimate the route which has been traversed by the vehicle up to its current position, and that route is then applied in map matching processing using map data expressing a street map of a region in which the vehicle is currently travelling, supplied from the map data input section 56, to obtain the current position of the vehicle with increased accuracy.

In addition, the navigation control section 50 of this embodiment includes a route guidance function, for estimating the optimum route from the current position of the vehicle to a specific destination and displaying that route. Information specifying the position of the destination is supplied by the vehicle driver, e.g., by input via the remote control sensor 54 through use of the remote control device 64a, or through the operating switches 58. When this information specifying the destination is supplied, the navigation control section 50 automatically calculates the optimum route to the destination, and controls the display device 52 to display that optimum route together with an indication of the current position of the vehicle.

The operating switches 58 may be integral with the display device 52, or may be separate mechanical switches.

In order to retain the most recently estimated current position and travel direction that have been derived by the vehicle navigation apparatus 1, when the vehicle ignition is switched off and operating power for the vehicle navigation apparatus 1 is thereby switched off, the vehicle navigation apparatus 1 includes some form of non-volatile memory for storing the most recently estimated current position and travel direction. This information is thereby available to the vehicle navigation apparatus 1 when the vehicle ignition is subsequently switched on and the vehicle is again driven. Such a non-volatile memory function may for example be implemented by the external memory 51.

The overall operation is as follows. When power is applied to the apparatus, the navigation control section 50 begins to execute various types of processing in accordance with a stored program. After the vehicle starts to be driven, speed pulses from the speed sensor 62 generated at a rate in accordance with the vehicle speed are used by the navigation control section 50 to calculate the distance traveled by the vehicle from the starting position. In addition, amounts of change in the travel direction of the vehicle are obtained by the navigation control section 50 based on an output signal produced from the gyroscope 60. Based on these amounts of traversed distance and changes in direction, the current position and direction of travel of the vehicle are calculated by the navigation control section 50, by dead reckoning navigation calculation. At that time, if GPS radio waves can be received by the GPS receiver 64, then the (absolute) position and travel direction of the vehicle are calculated at periodic intervals by the navigation control section 50, based on acquired GPS position measurement data, with these being applied to correct the most recent dead reckoning estimates of current position and travel direction, and with sets of resultant final corrected positions and travel directions being periodically applied to estimate the traversed route up to the current point in time of the vehicle, for use in map matching processing as described above to obtain accurate updated current positions of the vehicle.

Under normal driving conditions, a high level of accuracy for the current position and travel path of the vehicle will generally be achieved by such a type of vehicle navigation apparatus, through application of the GPS position measurement data and map matching processing as described above. However under certain special circumstances, it is possible for a large amount of error to arise in the estimated travel direction. Specifically, as described hereinabove, if the vehicle executes a number of successive complete turns within a short time interval such as when driving up successive ramps within a multistory parking lot, or the vehicle is driven onto a turntable and is then rotated through some angle with the vehicle ignition switched off, then such a large amount of error may arise in the vehicle travel direction that is estimated by the vehicle navigation apparatus. In the case of driving within a multistory parking lot, there are various reasons why such error may arise, as described in detail hereinabove.

In the case of the vehicle being rotated on a turntable with the ignition switched off, then assuming that when the ignition is thereafter switched on and the vehicle navigation apparatus thereby reactivated, when the most recently estimated travel direction is then read out from memory, there will inevitably be an amount of error (i.e., the angle through which the vehicle is turned with the ignition switched off) between that travel direction and the actual direction in which the vehicle will then begin to travel, irrespective of whether or not accurate travel direction information had been established based on GPS measurement data prior to switching off the ignition.

In such a case, it may be possible for the vehicle to begin to acquire GPS position measurement data immediately after being driven out of the multistory parking lot or immediately after being driven off of the turntable. However as described hereinabove, in the prior art, filter processing (such as Kalman filtering) is applied to estimated positions which are successively derived based on received GPS position measurement data. As a result, with a prior art type of vehicle navigation apparatus, when the vehicle ignition is switched on, and operation of the vehicle navigation apparatus is thereby restarted, some time will elapse before results produced from the filter processing become sufficiently accurate in correcting the dead reckoning position estimates, i.e., to obtain position information that is sufficiently accurate to enable map matching processing to be effectively applied.

Thus in the prior art it has been necessary for a significant amount of time to elapse, after such a special condition has occurred resulting in a substantial amount of error in the estimated travel direction of the vehicle, before accurate vehicle positions begin to be derived by the navigation control section 50 and displayed by the display device 52.

With this embodiment, if such a special condition has arisen, then each absolute estimated position that is derived from the GPS position measurement data thereafter is compared (without applying filtering processing) with the corresponding current vehicle position which is estimated by dead reckoning based on the output signals from the on-board sensors. If an amount of deviation between these two positions exceeds a predetermined value, then that absolute vehicle position and also the estimated travel direction which are derived from the GPS position measurement data are applied directly, to correct the position and direction derived by dead reckoning, i.e., these are assigned as a corrected vehicle position and travel direction that are used estimating the current travel path of the vehicle, for use in the map matching processing as described above.

These operations are executed using successively received sets of GPS position measurement data, until the deviation is judged to be below a predetermined level, whereupon the conventional mode of operation of the vehicle navigation apparatus (i.e., with filtering processing applied to successive vehicle position estimates derived from the GPS position measurement data) is resumed.

Figure 2:
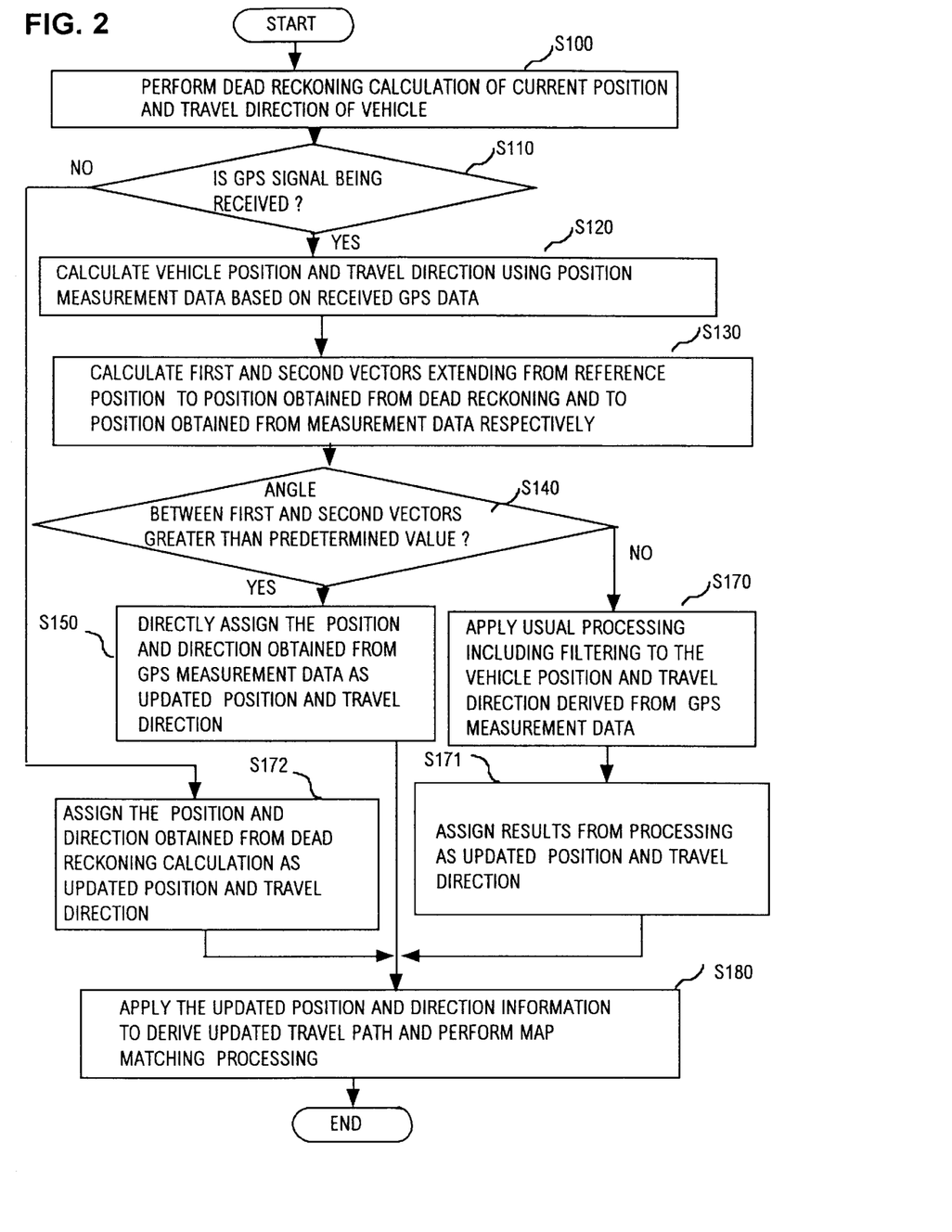
FIG. 2 is a flow diagram for illustrating the operation of the embodiment of FIG. 1.

The above can be understood by reference to the flow diagram of FIG. 2, showing a processing routine which is executed by the navigation control section 50 of this embodiment at periodic intervals, to obtain information expressing the current position and travel path of the vehicle The steps in FIG. 2 are as follows. Firstly in step S100 the current travel direction and position of the vehicle are calculated by dead reckoning based on data obtained from the on-board sensors, i.e., angular data in the interval extending from the preceding execution of this routine, and distance data obtained by multiplying the number of speed pulses produced by the speed sensor 62 within that interval by a distance coefficient (i.e., the distance which is traveled by the vehicle in the period between generation of two successive speed pulses). Next in step S110 a decision is made as to whether or not GPS signals are currently being received by the GPS receiver 64. If it is found that the GPS signals are being received, step S120 is executed in which the (absolute) current position and travel direction of the vehicle are calculated using the obtained GPS position measurement data. Step S130 is then executed, in which respective vectors are calculated, extending from the aforementioned reference position to the current position of the vehicle as estimated by the dead reckoning calculation of step S110 and the vehicle position obtained from the GPS data in step S120.

It will be assumed that with this embodiment, the reference position is determined each time that the vehicle ignition is switched on, i.e., the position which was most recently estimated by the vehicle navigation apparatus prior to switching of, the ignition is assigned as a new reference position when the ignition is switched on. In that case, the reference position will generally be sufficiently accurate, even if the vehicle has been driven onto a turntable and rotated after the ignition was switched off, or has been driven around a number of concentric turns prior to switching off the ignition, in a parking lot.

Next, in step S140, a decision is made as to whether or not the magnitude of the angular difference between the two vectors obtained in step S130 exceeds a predetermined value. If that value is judged to be exceeded then step S150 is executed, in which the absolute position and absolute travel direction that are calculated based on the GPS position measurement data in step S120 are directly assigned as the current position and travel direction of the vehicle. Step S180 is then executed, in which the assigned position and travel direction are used to update the estimated travel path of the vehicle, for use in the map matching processing.

If it is judged in step S140 that the angular difference between the two vectors does not exceed the predetermined value then step S170 is executed, in which a conventional type of filter processing such as Kalman filtering is applied to the vehicle position and travel direction obtained in step S120. In that case, position and travel direction results obtained from the filter processing are assigned as the updated current position and travel direction (S171), then step S180 is executed using these, to update the current travel path of the vehicle for use in the map matching processing.

If it is found in step S110 that the GPS signals are not currently being received by the GPS receiver 64, then as indicated by step S172, the position and travel direction that are derived in step S100 are assigned as the update position and travel direction of the vehicle, and S180 then executed using that position and travel direction to update the estimated travel path.

It will be understood that the basic principles of the operation described above are as follows. The aforementioned angular amount used in the judgement step S140 is determined such that if the angular difference between the aforementioned two vectors exceeds that predetermined amount, then it can be assumed that the accuracy obtained by applying the results obtained from the filter processing to correct the dead reckoning estimates of position and travel direction will be lower than the accuracy that will be obtained by directly using the absolute vehicle position and travel direction which are obtained based on the GPS positioning data, in spite of the error which may be present in that absolute vehicle position estimate.

That is to say, the magnitude of the predetermined value of angular difference that is used for judgement in step S140 must be established based on the range of error known to occur in estimated vehicle positions which are derived directly from GPS position measurement data.

It should also be noted that there is a basic advantage in using the respective vehicle positions obtained in steps S100 and step S130 (i.e., when GPS data are first acquired after leaving the reference position) in relation to the reference position, for performing the judgement step S140, rather than directly comparing an estimated travel direction obtained from the GPS data in step S130 with the (relative) travel direction obtained in step S100. This is due to the fact that a travel direction estimate cannot be obtained based on the received GPS positioning data while the vehicle is stationary. However with this embodiment, if acquisition of GPS positioning data occurs when the vehicle is halted at traffic lights for example, the judgement step 140 can be successfully performed. This ensures that the current position and path of the vehicle can be rapidly obtained in such circumstances, soon after the vehicle has departed from the reference position.

Figure 3:
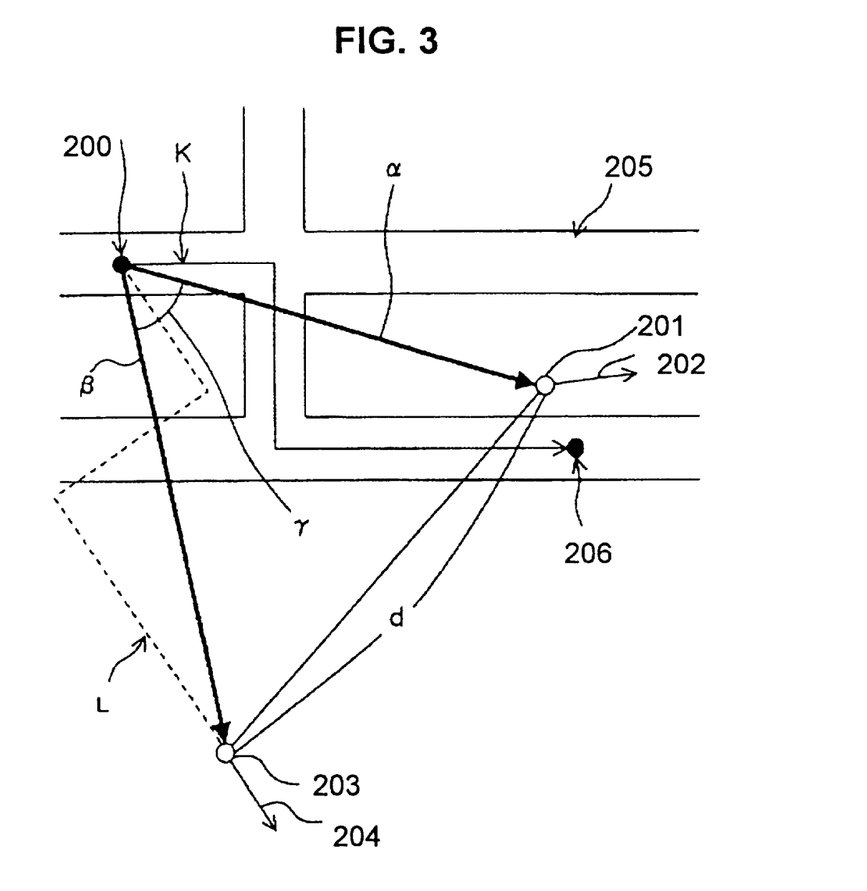
FIG. 3 is a map diagram for use in describing details of the operation of the embodiment of FIG. 1.

The essential features of the operation shown in FIG. 2 will be described in greater detail with reference to the conceptual map diagram of FIG. 3. In FIG. 3, it is assumed that the vehicle ignition is switched on at a position indicated by numeral 200. As a result, data expressing the most recently estimated position of the vehicle are read out from memory for use as the aforementioned reference position. The actual route along which the vehicle then drives is indicated by the thin line K. It is assumed that the vehicle travel direction that is derived by the vehicle navigation apparatus when the vehicle departs from the reference position 200 differs substantially from the actual travel direction. As a result, even if reception of GPS signals begins after leaving the reference position 200, with a conventional vehicle navigation apparatus in which processing such as Kalman filter processing is applied, it is possible that no effective correction based on the GPS position measurement data will have been applied, until after the vehicle has passed the actual position 206. As a result, the travel path that is derived by the vehicle navigation apparatus might be as indicated by the broken-line route L.

Thus there could be large deviations between actual positions and travel directions attained by the vehicle and those which are derived by the vehicle navigation apparatus, for some time after the vehicle departs from the reference position.

However with this embodiment of the invention, if it is found (step S110 of FIG. 2) when the vehicle attains the actual position indicated by numeral 206 that the GPS signals are being received, then a position such as that indicated by numeral 201 and a corresponding travel direction as indicated by numeral 202 are directly derived from the GPS position measurement data (step S120), while at that time the position which is derived by dead reckoning calculation (step S100) is as indicated by numeral 203 while the correspondingly derived direction is indicated by numeral 204. The vector α extending from the reference position 200 to point 201 is calculated, together with the vector β extending from reference position 200 to the point 203, (step S130) and the angular difference γ between these vectors then obtained and judged (step S140). If the absolute magnitude of that difference exceeds the predetermined value (i.e., a YES decision in step S140) then the position 201 and travel direction 202 that have been obtained directly from the GPS data are assigned (step S150) to be the position and travel direction which will be used in updating the travel path of the vehicle, for use in the map matching processing (in step S180).

Thus as can be understood from FIG. 3, under a condition in which a large amount of error has arisen in the estimated travel direction (and hence, subsequently, in the estimated vehicle positions) when departing from a reference position, the invention enables the effects of such a direction error to be rapidly eliminated as soon as reception of GPS signals is achieved, by directly utilizing position and travel direction information obtained from received GPS data, without applying the usual filter processing. In the example of FIG. 3, whereas it would be impossible to perform correct map matching processing using the estimated position 203 and travel direction 204, it will be apparent that accurate map-matching to the actual path of the vehicle can be achieved using the position 201 and travel direction 202.

Figure 4A:
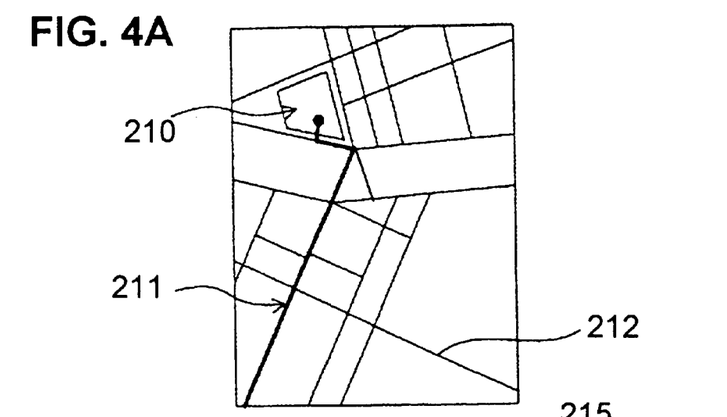
FIGS. 4A to 4C are map diagrams for use in describing a specific example of the effects obtained by the invention.
Figure 4B:
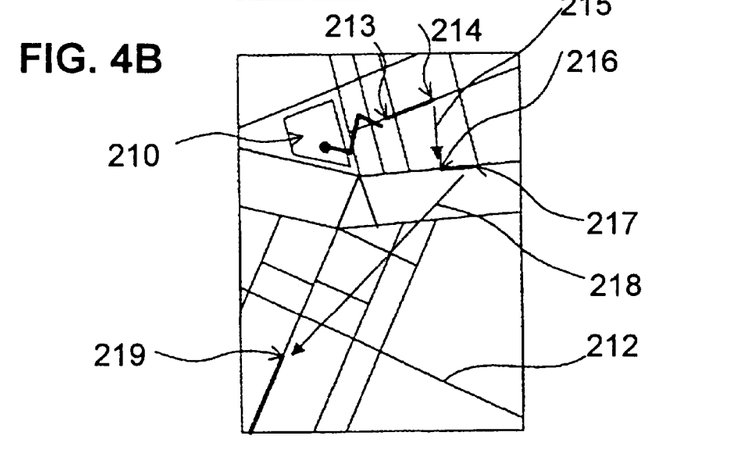
Figure 4C:
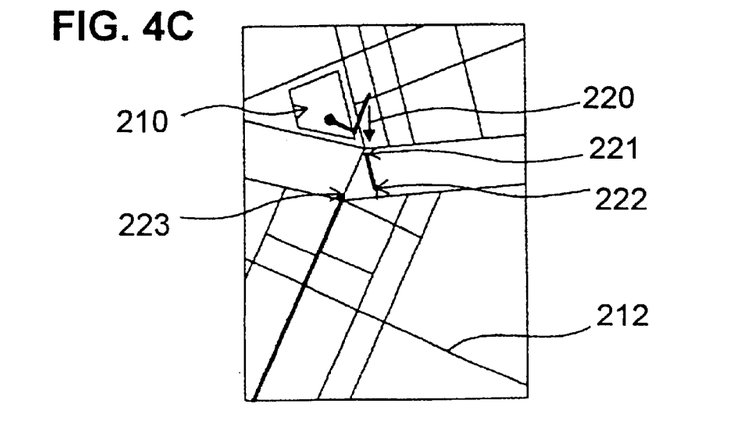

The advantages of the embodiment are further illustrated in the conceptual map diagrams of FIGS. 4A to 4c. In FIG. 4A, the dark line 211 represents the actual path which is traveled by a vehicle after departing from a parking lot 210. It is assumed that due to one of the special conditions described hereinabove having occurred in the parking lot, the travel direction that is estimated by the vehicle navigation apparatus of the vehicle through dead reckoning calculations, when the vehicle starts to be driven out of the parking lot, contains a large amount of error. As shown, upon leaving the parking lot the vehicle manes a left turn onto a road, then soon after performs a right turn onto another road, and proceeds along a straight path.

FIG. 4B shows the results which might be obtained from a prior art type of vehicle navigation apparatus in such a case, assuming that the amount of error in the estimated travel direction when the vehicle starts to be driven is approximately 90 degrees. That is, it is assumed that GPS signals begin to be received by the vehicle, each estimated position and travel direction that are obtained based on the GPS data is subjected to the aforementioned filter processing, with results from the processing being applied to update the dead reckoning position and travel direction estimates, with the current path of the vehicle being estimated thereby and used in map matching processing. To simplify the diagrams, the estimated travel directions are omitted. In that case, due to the filter processing being applied, the received GPS positioning data will not have an immediate effect upon the accuracy of the map matching processing. Hence, the first results from the map matching processing might indicate that the vehicle has traveled from point 213 towards point 214 in FIG. 4B. The next results from filter-processed GPS data, might then indicate that the vehicle has moved as indicated by the arrow line 215, to a point close to the position 216. That, in combination with the estimated travel direction obtained from the filter processing, might then result in map matching results whereby the vehicle is shown as travelling from position 216 to the position 217.

Finally, the position and travel direction information obtained from the filter processing results reach a sufficient level of accuracy, so that these indicate that the vehicle has moved close to the position 223, as indicated by the arrow line 218. As a result, effective map matching processing can then be applied, with results which correctly indicate the actual path traveled by the vehicle, starting from point 219.

FIG. 4C illustrates the corresponding results which might be obtained in the case of a vehicle navigation apparatus according to the present invention. In this case, when the first estimated position and travel direction are obtained directly from the GPS positioning data, it is assumed that these change the estimated position of the vehicle, from the most recent dead reckoning position, as indicated by the arrow line 220, i.e., to a point close to the position 221. When map matching processing is applied based on that estimated position and the travel direction which is also directly obtained from the GPS data, the vehicle is judged to be travelling along the path from point 221 towards point 222. At the time when it is estimated that position 222 has been reached, another estimated position and travel direction are obtained directly from the GPS data, and these indicate that the vehicle has reached a position close to point 223 (i.e., the actual position of the vehicle at that time) moving in a direction that is approximately the actual travel direction. The results of map matching processing performed using that information then provide the correct path which the vehicle is traversing that time.

Thus, the actual travel path of the vehicle has rapidly been obtained.

The invention is not limited in configuration and operation to the embodiment described hereinabove, and various modifications could be envisaged which fall within the scope claimed for the invention. For example with the above embodiment, the angular difference γ between the two vectors α and β shown in FIG. 3 is used as a basis for the judgement performed in step S140. However it would be possible to use instead the distance between an estimated position obtained from the GPS position measurement data and the corresponding dead reckoning estimated position, such as the distance "d" indicated between the positions 203, 201 in FIG. 3. In that case, a judgement would be made (in a step corresponding to S140 in FIG. 2) as to whether that distance exceeds a predetermined value. It will be apparent that with this method too, the judgement operation of step S140 can be successfully performed even if the vehicle is temporarily halted when the GPS data are acquired, since it is not necessary to use an estimated travel direction obtained based on the GPS data.

As can be understood from FIG. 3, the value of the distance "d" will successively increase as the vehicle travels further from the reference position. An appropriate value for the judgement threshold distance, in the case in which that distance "d" is judged, must be determined based upon the known range of error of the vehicle position estimates which are obtained directly based upon the GPS position measurement data.

Alternatively, it would be possible to modify the judgement step S140 shown in FIG. 2 such that step S150 is executed either if it is judged that the angular amount γ has exceeded a predetermined angular value or if it is judged that the distance "d" has exceeded a predetermined distance value.

Figure 5:
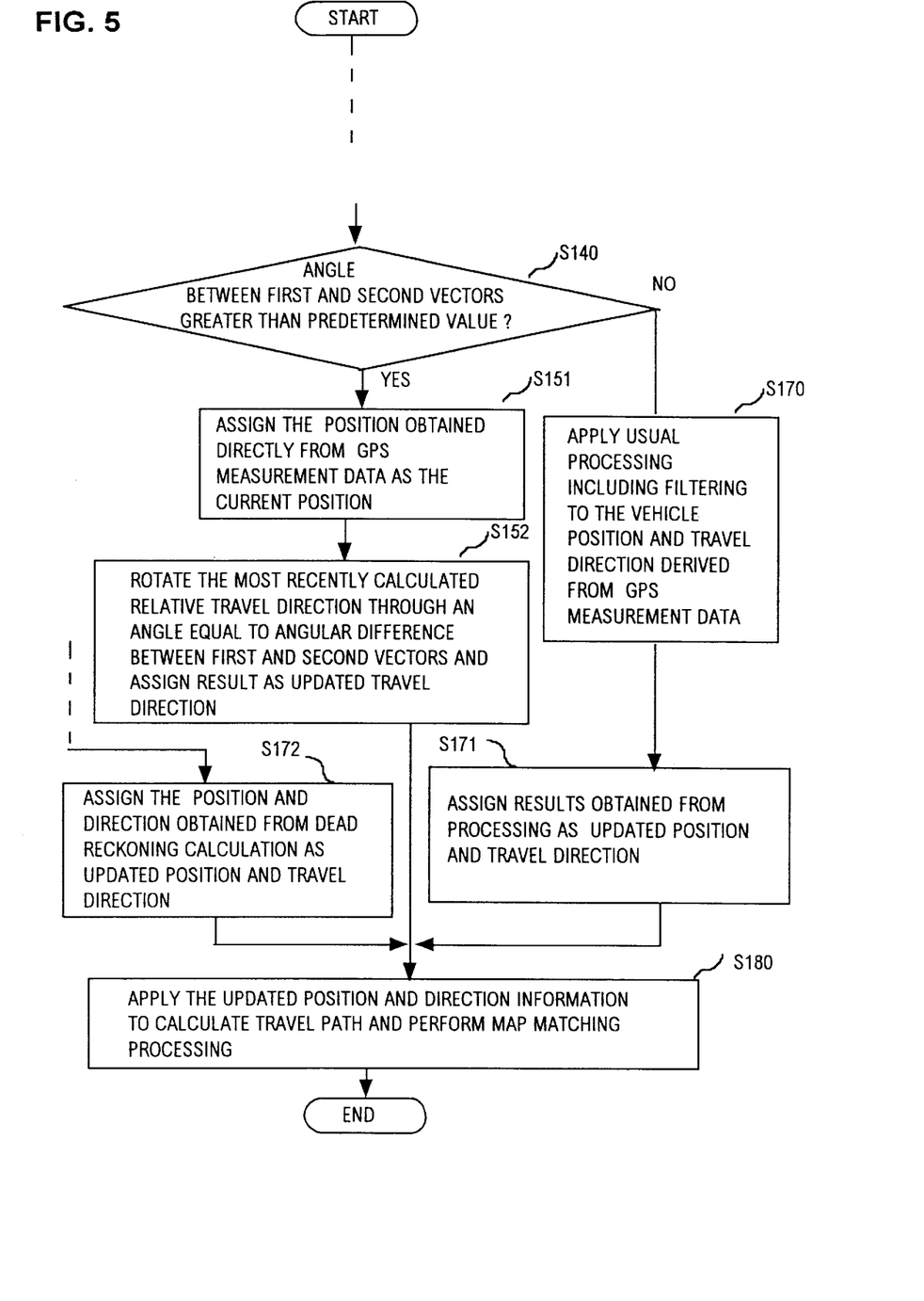
FIG. 5 is a partial flow diagram for describing an alternative form of operation of the embodiment of FIG. 1.

Furthermore with the above embodiment it is assumed that in step S150, a travel direction which is obtained directly based on the GPS data is assigned as the current travel direction, for use in step S180. However as mentioned above, it is only possible to obtain a travel direction estimate based on received GPS data if these data are received while the vehicle is in motion. For that reason it may be preferable to instead assign, as the current travel direction in step S150, the direction obtained by rotating the travel direction which is calculated by dead reckoning in step S100 through an angle equal to the angular difference γ between the vectors α and β shown in FIG. 2. In that case, even if the first GPS positioning data to be received after leaving the reference position should be received while the vehicle is temporarily halted, e.g., at traffic lights, an appropriate travel direction that is derived based on the GPS data can be assigned as the travel direction to be used in the map matching processing of step S180. It can thereby be ensured that successful map matching processing can be achieved soon after a condition of excessive error in the dead reckoning estimate of travel direction has arisen, under all conditions of operating the vehicle. Such a modification of the operation shown in FIG. 2 is illustrated in the partial flow diagram of FIG. 5, in which the step 150 of FIG. 2 is replaced by steps S151, S152. All other steps in the flow diagram of FIG. 5 are identical to those of FIG. 2.

Moreover with the above embodiment it is assumed that reference position which is used in steps S130, S140 is the estimated position of the vehicle at the time when the vehicle ignition was last switched on. However as an alternative (or in addition to that function) the navigation control section 50 could include a function for monitoring the output signal from the gyroscope 60, to detect a condition whereby a predetermined number of successive complete turns have been executed by the vehicle within less than a predetermined time interval, and for assigning the estimated current position of the vehicle when the successive turning of the vehicle is detected as having ended, as the reference position. In that case, a reference position can be established as a position of occurrence of the aforementioned condition whereby the vehicle is driven around successive ramps within a multistory car park, with a substantial amount of error thereby arising in the dead reckoning estimate of travel direction. It would of course be possible to provide both of the above arrangements for establishing a reference position.

It should thus be understood that the above description of an embodiment is to be taken in a descriptive and not in a limiting sense, and that various modifications of the embodiment features could be envisaged which fall within the scope claimed for the invention.

What is claimed is:

1. A vehicle navigation apparatus comprising:

sensor means for producing signals indicative of amounts of change in heading direction of a vehicle and amounts of change in distance traveled by said vehicle;

current position calculation means for calculating successive current positions and travel directions of said vehicle based on said signals produced from said sensor means, said current position calculation means including Global Positioning Satellite (GPS) receiving means for receiving GPS system radio waves and for thereby deriving position measurement data relating to said vehicle, means for applying predetermined filter processing to said position measurement data, and GPS correction means for periodically applying data resulting from said filter processing to correct respective errors in said current positions and travel directions which are calculated by said current position calculation means to obtain corrected current positions and travel directions;

means for registering as a reference position a specific position which is estimated by said apparatus as having been attained by said vehicle, and wherein said means for registering said reference position comprises means for detecting that said vehicle has executed a plurality of successive complete turns, and wherein an estimated current position of said vehicle which is derived by said vehicle navigation apparatus upon completion of said turns is determined as said reference position; and error judgement means for judging a deviation which is indicative of at least one of said respective errors in said current positions and travel directions, to determine whether or not said deviation exceeds a predetermined amount, said deviation being judged based on relative positions, with respect to said reference position, of a first position which is an estimated position of said vehicle calculated from said position measurement data and a second position which is an estimated position of said vehicle calculated by said current position calculation means substantially concurrently with said calculation of said first position; and wherein said GPS correction means is adapted to directly apply said position measurement data to correct said respective errors in said current positions and travel directions to thereby obtain said corrected current positions and travel directions, without application of said filter processing, when it is judged by said error judgement means that said predetermined amount is exceeded.

2. A vehicle navigation apparatus comprising:

sensor means for producing signals indicative of amounts of change in heading direction of a vehicle and amounts of change in distance traveled by said vehicle;

current position calculation means for calculating successive current positions and travel directions of said vehicle based on said signals produced from said sensor means, said current position calculation means including Global Positioning Satellite (GPS) receiving means for receiving GPS system radio waves and for thereby deriving position measurement data relating to said vehicle, means for applying predetermined filter processing to said position measurement data, and GPS correction means for periodically applying data resulting from said filter processing to correct respective errors in said current positions and travel directions which are calculated by said current position calculation means to obtain corrected current positions and travel directions;

error judgement means for judging a deviation which is indicative of at least one of said respective errors in said current positions and travel directions, to determine whether or not said deviation exceeds a predetermined amount, wherein said GPS correction means is adapted to directly apply said position measurement data to correct said respective errors in said current positions and travel directions to thereby obtain said corrected current positions and travel directions, without application of said filter processing, when it is judged by said error judgement means that said predetermined amount is exceeded;

map data storage means for storing and providing map data including road map data;

means for estimating a travel path which has been traversed by said vehicle up to an estimated current position of said vehicle, based on said corrected current positions and travel directions; and means for periodically performing a map matching processing operation, to compare said travel path with said road map data and apply correction for a residual error in said corrected current positions, based on results of said comparison, to obtain a final corrected current position of said vehicle.

3. A vehicle navigation apparatus as claimed in claim 2, further comprising;
   display means; and
   means for reading out, from said map data storage means, road map data corresponding to a region in which said vehicle is currently located and supplying said road map data together with data expressing said final corrected current position, to thereby produce a display of a road map of said region with said final corrected current position visibly distinguished therein.

4. A vehicle navigation apparatus as claimed in claim 2, further comprising means for providing a guidance function comprising:
   means operable for externally inputting data indicative of a required destination of said vehicle;
   means for calculating an optimum route extending from said final estimated current position of said vehicle to said destination;
   display means; and
   means for reading out from said map data storage means road map data corresponding to a region containing said optimum route and supplying said road map data to said display means together with data expressing said final corrected current position and said optimum route, for thereby producing a display indicative of a relationship between said final estimated current position and said optimum route.

5. A vehicle navigation apparatus as claimed in claim 1, wherein said respective processing, calculation and judgement means of said apparatus are implemented by a computer system operating under control of a program which is stored on a readable data storage medium.

6. A vehicle navigation apparatus comprising:
   sensors for detecting changes in a vehicle heading direction and in vehicle distance traveled and for producing change signals representative of the changes in the vehicle heading direction and in the vehicle distance traveled;
   a Global Positioning Satellite (GPS) receiver for receiving GPS signals and for deriving vehicle position measurement data from the GPS signals; and
   a navigation controller for periodically calculating current vehicle position and vehicle travel direction based on the change signals produced by the sensors, for registering a vehicle attained position as a reference position, for detecting a plurality of successive vehicle turns, for deriving the reference position based on the plurality of successive turns, for determining if a deviation indicative of at least one of a plurality of respective errors in the current vehicle position and the vehicle travel direction exceeds a predetermined amount based on relative positions of a first estimated position and a second estimated position with respect to the reference position, the first estimated position being based on the position measurement data and the second estimated position being based on the current vehicle position and the vehicle travel direction, and for determining a corrected current vehicle position and a corrected vehicle travel direction,
   wherein the navigation controller is further for applying predetermined filter processing to the vehicle position measurement data derived by the OPS receiver and for applying data resulting from the filter processing to correct respective errors in the current vehicle position and vehicle travel direction to determine the corrected current vehicle position and the corrected vehicle travel direction when the deviation does not exceed the predetermined amount, and
   wherein the navigation controller is for applying position measurement data to correct the respective errors to thereby obtain the corrected current vehicle position and vehicle travel direction when the deviation exceeds the predetermined amount.

7. A vehicle navigation apparatus comprising:
   sensors for detecting changes in a vehicle heading direction and in vehicle distance traveled and for producing change signals representative of the changes in the vehicle heading direction and in the vehicle distance traveled;
   a Global Positioning Satellite (GPS) receiver for receiving GPS signals and for deriving vehicle position measurement data from the GPS signals;
   a map data input for storing and providing map data including road map data; and
   a navigation controller for periodically calculating current vehicle position and vehicle travel direction based on the change signals produced by the sensors, for determining if a deviation indicative of at least one of a plurality of respective errors in the current vehicle position and the vehicle travel direction exceeds a predetermined amount, for determining a corrected current vehicle position and a corrected vehicle travel direction, for estimating a vehicle travel path based on the corrected current vehicle position and vehicle travel direction, and for periodically performing a comparison between the vehicle travel path with the road map data to correct residual errors in the corrected current vehicle position based on results of the comparison to obtain a final corrected current vehicle position, vehicle travel direction to determine the corrected current vehicle position and the corrected vehicle travel direction when the deviation does not exceed the predetermined amount, and
   wherein the navigation controller is for applying position measurement data to correct the respective errors to thereby obtain the corrected current vehicle position and vehicle travel direction when the deviation exceeds the predetermined amount.

8. The vehicle navigation apparatus of claim 7, further comprising a display device,
   wherein the navigation controller is further for reading road map data from the map data storage data corresponding to a current vehicle location region and is for supplying the road map data and the final corrected current vehicle position to the display device.

* * * * *